Patented Feb. 25, 1941

2,232,697

UNITED STATES PATENT OFFICE 2,232,697

METHOD OF REMOVING OUTER COAT MATERIAL FROM CEREAL GRAINS

Theodore Earle, Pacific Palisades, Calif.

No Drawing. Application September 2, 1938, Serial No. 228,111

3 Claims. (Cl. 83—28)

This invention relates to methods of treating cereal grains for the progressive detachment and separate recovery of outer husks and bran coat normally adherent to the starchy grain kernel or berry proper, and has as an object to provide a novel and improved sequence of operations constituting a process susceptible of employment alone, or in association with either or both of the processes described in my Letters Patent of the United States, Nos. 2,155,219 and 2,143,306, to detach and separately recover the outer husks and bran coats from cereal grain berries.

A further object of the invention is to provide an improved method operable to quickly, positively, and cleanly detach and separate outer husks and bran coat from cereal grain berries with a minimum loss of weight and substance in the berry.

A further object of the invention is to provide an improved method operable to physically detach and efficiently segregate for separate recovery cereal grain material of distinctively characteristic properties.

A further object is to provide an improved method operable to separate and separately recover cereal grain material of distinctively characteristic properties in the form of novel and hitherto unknown products.

A further object of the invention is to provide an improved method operable to efficiently concentrate certain characteristic properties of cereal grain material in separately recoverable products of high purity.

A further object of the invention is to provide an improved method of treating cereal grains to enhance and modify the germinating and growing properties of the grains when used as seed.

A further object of the invention is to provide an improved method of the character described which is simple, rapid, and inexpensive of practical operation, highly efficient to the ends sought, characterized by minimum damage to or destruction of the grain material treated thereby, and which is readily available for the successful treatment of various specific cereal grains.

My invention consists in the character, sequence, and combination of specific steps constituting the improved method as hereinafter set forth and pointed out in the appended claims.

Cereal grains such as wheat, rye, barley, oats, corn, and the like, when prepared for the market, consist of grains or berries characterized by a starchy endosperm wherein is embedded the germ or embryo of the grain and a husk and/or bran shell enclosing the endosperm and germ. Each element of the grain berry has certain distinctive properties which are of value in the human diet, the starch of the grain together with some protein being found in the endosperm while the bulk of the grain vitamin and inorganic content is found concentrated in the bran shell and germ. Through complete and precise detachment of the entire woody, outer coating from the grain berry, as hereinbelow described, a desirable concentration and isolation of distinctive grain properties can be had, thereby facilitating control of the amount of such properties present in food products wherein the grain elements are utilized. The precise detachment and complete separation of the distinctive grain material possible through exercise of my improved method facilitates milling processes to which the material may be subsequently subjected and the improved method has further advantage in that it may be employed for the progressive detachment of husk or bran layers from certain grains, notably wheat and rye, to leave a millable product whereon is retained such portion of the bran as may be desired in the finished meal of flour.

While the improved method has been successfully applied to the detachment and separate removal of the husk and bran coats from various of the cereal grains, the technique employed and results obtained when wheat is treated by the improved method will first be described in detail because of the relatively greater importance of wheat in the economy of the human race.

The wheat grain, when threshed for removal from its husk and as delivered to the miller, consists of an endosperm which constitutes the starchy center of the berry, comprises some eighty-two percent of the entire grain, contains about eleven percent of the protein, and only a trace of the known vitamin; an embryo or germ embedded in one side of the endosperm which is one of the richest known sources of vitamins B and E; and a shell or outer coat known as bran containing six distinct laminations and which provides vitamins B and E, iron, phosphorus, proteins and roughage, and which, with the embryo, comprises substantially eighteen percent of the entire kernel or grain. The outer or woody layer of the bran varies somewhat in character and may be removed and recovered separately for such subsequent use, independently or in recombination with the milled endosperm, as may be determined to be expedient or desirable.

All of the bran coat lamination must be removed from the endosperm prior to milling of the latter for the production of white flour, and the conventional processes employed to effect such removal to the essential degree required separate some twenty percent of the entire grain as bran, another twelve percent as "middlings" (bran and shorts), and from two to five percent as shorts, a considerable amount of the endosperm and germ being simultaneously detached and separated with the bran, middlings, and shorts. The cleaned endosperm resulting from the use of conventional milling processes has lost much of the material sought to be retained for food, and is rubbed, abraded, and broken, while the separated bran contains particles of the endosperm and germ and is not in condition, without further cleansing treatment, for use as bran per se, or for recombination with meals and flours to add thereto the known bran properties in definite proportions. The improved method operates to cleanly, precisely, and completely detach and separately recover the outer bran coat, leaving the endosperm and inner bran coats intact, and may be operated to remove and separately recover the outer, woody bran coat lamination, and leave the balance of the bran coat laminations on the endosperm for milling with the latter. Further, the improved method does not impair the food value of or remove the vitamin-rich embryo, whereas conventional processes take out the embryo with the middlings or shorts, with consequent disadvantage in the adjustment of the characteristic grain properties.

Detachment of the outer, woody bran coat lamination from the grain is accomplished through agitation of the grain in a water bath of sufficient volume to permit free movement of the grains relative to each other and to the apparatus employed. This free movement is essential, since the grains must move about into and out of repetitious rubbing contact with each other and with elements of the apparatus employed to free the outer bran coat from the grain, and the water volume must also be sufficient to cushion or soften any impact effect between grains or between the grains and elements of the apparatus to a degree that will preclude injury to the grain structure. Upon immersion, different portions of the outer lamination of the bran coat react successively to the water at different periods of time, soften somewhat and develop wrinkles, thereby becoming loosened from the underlying lamination sufficiently to permit of its being rubbed off of the grain as the latter is agitated through the water of immersion, against other grains, and against surfaces and elements of the apparatus wherein the agitation is developed. There is a quite definite time period involved in the detachment of the first part of the outer bran coat from the remaining portion of this coat, depending somewhat on whether or not the grain has been soaked or water-conditioned before the agitation is started, but detachment of this first part is definitely complete in time to permit of removal of the detached material, either by decanting or the flotation technique hereinafter described, before detachment of the second part of the outer bran coat begins to any appreciable extent. Agitation of the grain material in the water bath is continued after detachment of the first part or layer of the outer bran coat and the initial phase is repeated with respect to the second part or layer, which softens, wrinkles and separates from the grain in the same manner as the first part, and in a well-defined time period. At the conclusion of the second phase, the detached second part of the outer bran coat is removed from the apparatus as above suggested for the first part, and the agitation is then continued to like detachment, separation and removal of a third part of the outer bran coat, which is the last of this type adhering to the endosperm. All of these three parts of the outer bran coat are woody in character.

While it has been above suggested that the different parts of the outer bran coat are progressively removed from the apparatus as their detachment from the grain is completed, it will be obvious that these detached parts may be permitted to remain in the apparatus until all have been detached from the berry or grain, whereafter separation of the detached bran from the cleaned grain may be had. However, the different parts of the outer bran coat of wheat berries vary somewhat in character and distinctive properties to a degree which may warrant their separate removal and recovery, a definite time lapse which occurs between completion of one detachment phase and initiation of the progressively subsequent detachment phase permitting the separate recovery of these parts as progressively detached without interruption of a continuous operation effective to complete thorough cleansing of the grain material. The whole grain may be initially water-conditioned, by soaking or otherwise, to facilitate detachment of the woody bran lamination during subsequent agitation of the material, but such water-conditioning saves little of the time of agitation and may result in absorption of a relatively greater amount of water within the grain berry proper and the bran, thereby necessitating a longer drying step to condition the separated products for practical use. Further, excessive water-conditioning may result in extraction from the bran coats of certain of their water-soluble properties which it may be desired to retain either in the berry or in the bran, hence, in general, it is desirable to dispense, as far as possible, with any preliminary soaking or conditioning of the grain prior to its immersion in the bath of agitation.

Agitation of the grain material for the purpose and to the ends above specified may be accomplished through any suitable apparatus, the specific separatory method to be employed for progressive or simultaneous removal of the detached bran parts necessarily limiting the type of agitating means. It is not necessary that the agitating apparatus be such as will subject the grain material to a rubbing action against or between elements of the apparatus itself, since it seems to be readily apparent that rubbing of the grains against each other and relative movement of the grains in and through the water bath is sufficient to physically detach the initially wrinkled and loosened bran from the grain berry. Such being the case, any apparatus productive of a degree of agitation which will maintain free and continuous movement of the grains within and about a water bath is adequate to effect the detachment desired. Conventional flotation apparatus has been successfully employed to produce an agitation effective for the progressive detachment of the bran coat parts from wheat and rye, the impeller element of the apparatus being operated at relatively moderate speed to avoid injury to any of the grains with which it might come in contact; likewise, a rod mill having a steel or rubber-lined shell equipped with relatively few rubber-covered rods and operated at moderate speed with no cascading effect of the rods proved successful in the production of an agitation adequate to the detachment of the bran coats as above set forth. Any functionally equivalent combination of means comparable to the foregoing, such as a rubber-lined shell having steel rods, may be employed for the purpose specified, so long as cascading or impact effect is avoided. Essentially, the agitating apparatus must provide capacity for a water bath such as will permit free and continuous movement of the grain material therein, together with means for agitating the water bath and its grain content sufficiently to maintain the grain in motion within the bath without destructive or damaging effect on the grain material.

Various methods may be employed for the progressive or simultaneous removal of the various parts of the detached outer lamination from the cleaned grain. A simple method which may be practiced with reasonable efficiency involves utilization of the difference in specific gravity between the grain berry and the bran, whereby the lighter bran may be skimmed or decanted away from the heavier grain material remaining in the water bath of agitation. This method is well adapted for employment when detachment of the bran laminations is accomplished in the above described type of rod mill or comparable apparatus and may readily be made effective for the separate removal and recovery of the progressively detached bran parts, the time lapse between the progressive detachment phases being adequate for this purpose. An advantage of material practical importance deriving from the use of flotation apparatus for agitation of the grain material during detachment of the different parts of the outer bran coat is found in the fact that the efficiency and speed of the progressive separation and removal of the detached bran coat from the cleaned grain can be facilitated and enhanced through the use of froth flotation technique. Using a froth flotation unit for the progressive detachment of the different parts of the outer bran coat, a flotative reagent may be added to the water bath during the agitation or immediately upon completion of the first detachment phase and the detached material thus quickly and positively levitated into a froth bed wherewith such material is conveniently removed from the apparatus without interruption of the progressively subsequent phases of a continuous process. Continuing the agitation until detachment of the second part of the outer bran coat is complete, further addition of flotation reagent acts to levitate the detached second part of the outer coat into the froth bed thereby formed for separate removal and recovery of the detached material as a distinctive product. In like manner, the third and final part of this outer bran coat lamination may be separated from the clean grain material and removed from the apparatus, thereby isolating four distinctive products, the first, second, and third parts of the outer bran coat lamination, and the cleaned grain material. When wheat is treated in the manner above described, it is found that the first two parts of the outer bran coat lamination are readily levitated through the agency of a frothing reagent, such as pine oil, terpinol, the higher alcohols, commercial frothers, and the like, used in relatively very small amounts, while the third part of the outer bran coat is sometimes more readily and completely levitated by the use of a collector, such as a fatty acid or derivative thereof, or some of the vegetable or mineral oils, in small amounts.

As will be obvious, the progressive removal of the separate parts of the outer bran coat lamination may be dispensed with and all of the detached material levitated into the froth bed by the use of suitable reagents for removal from the apparatus after detachment of the outer bran coat from the grain berry is complete.

The specific reagent to be employed for the separation as a froth concentrate of a given detached bran coat lamination from the grain must be one that evidences a selective affinity for the detached material to be levitated, and the term "selective affinity" as used herein refers to that characteristic of the reagents which results in their surface adsorption on and adherence to the bran material sought to be levitated, as distinguished from the grain material, thereby selectively conditioning such bran material for ready attachment to levitating air and gas bubbles.

Strictly speaking, there are six recognized, distinct bran laminations on a wheat berry of which the woody outer coat can be stripped, by my improved method, from the balance of the five inner coats and, in this stripping operation, can be separated into three distinct parts. These three parts of the woody outer coat, as produced by the new method are, either alone or together, entirely new products not heretofore known or available on the market. The whole wheat or rye berry stripped of the woody coating of bran only is also a new product and not heretofore available. Oat and barley berries so cleanly stripped of their husks without damage to the berry proper or the bran coats on the berry are also new to the trade.

The first part of the outer bran coat is found to consist of relatively large or coarse flakes of a light tan color which are very light and feathery in character and easily agitated by faint currents of air, there being no particles or fragments of the endosperm mixed therewith. The second part of the outer bran coat separated and removed by my improved method is somewhat heavier and darker in color than the first part, is composed of relatively smaller particles not so feathery in character as the first coat, and is still free from particles or fragments of the endosperm. The third and final part of the outer bran coat removable by my improved method is not at all feathery, is made up of small particles of a thin, dark colored skin which is quite heavy in comparison with the first two bran parts, the color being a rather dirty gray and is mixed with small particles of the first two bran parts and a very few embryos and fragments detached from the endosperm. The grain berry remaining after removal of its bran coat is bright and clean in color, free from adhering woody outer bran coat particles, smooth and unbroken as to surface, and generally carries the embryo intact in its normal embedded relation within the endosperm, whence it may be readily removed by conventional milling processes. Thus the endosperm is prepared for immediate milling after drying, with a minimum loss of germ and endosperm material.

The loss of weight through bran removal by conventional processes runs in excess of twenty percent, while with my improved method the first part of the outer bran coat, when removed, represents about three percent of the original grain weight, the second part about one percent of the original grain weight, and the third part less than one-half of one percent of the original grain weight. The total weight of bran thus removed by the improved method represents less than four and one-half percent of the grain weight as against the twenty percent or more removed through conventional processes. The three parts of the outer bran coat detached and recovered separately from the endosperm may be milled or processed, as may be desired, recombined with the flour or meal milled from the endosperm in such quantity or proportion as may appear expedient or advantageous, or may be used for various food and industrial purposes as their distinctive properties may warrant. Where it is desired to mill a flour or meal containing a portion of the outer bran coat, the improved method may be continued only to removal of a portion of such outer bran coat, leaving the remainder of the bran on the endosperm, by which means an endosperm carrying some part of the outer bran coat laminations may be rapidly and efficiently produced. The time period necessary for completion of the various phases of the improved method as above described will vary somewhat according to the specific material being treated and the type and operative characteristic of the apparatus employed, the examples hereinafter specifying such time periods as developed in connection with actual practice of the invention.

The improved method may be employed for removal of the husks and outer coatings adherent to rye, barley, oats, and corn, as well as comparable grain material, the technique necessarily differing somewhat with differences in the specific nature and character of the grain material to be treated.

Rye is closely similar to wheat in its reaction to treatment by the improved method and sheds its outer woody bran coating or envelope in three distinctive and progressively removable parts in the manner hereabove described in connection with wheat, the bran coat parts progressively removed from rye comprising very closely with the corresponding bran coat parts detached and separated from the wheat berry.

In the case of barley, about ninety percent of the husk material remaining on the grain after the most thorough threshing can be detached and removed by the improved method, the husk material in this instance coming off as a single layer after it has been loosened by relatively more prolonged soaking or water conditioning.

The hard outer shell of the corn grain can be removed through use of the improved method, but the treatment of this grain involves a long soaking or water-conditioning period and prolonged, relatively violent agitation of the grain for separation of the shell in a single layer. Once detached, the separated elements of the corn grain can readily be isolated for separate removal from the apparatus by the use of suitable flotation reagent and technique or by gravity methods.

Tests have established that dehusking of the oat and barley grains can be practically and efficiently accomplished through use of the principles of my invention. Detachment of the husks from these grains is best accomplished in a steel or rubber-lined rod mill equipped with a number of rubber-covered rods less in number than will cascade at the speed of mill rotation employed, which apparatus will efficiently loosen and detach the husks from the grain without damage to the latter. Further detachment of the husks and separation of the detached husk material from the grain material may be subsequently accomplished in froth flotation apparatus to which the material from the rod mill is preferably transferred, high impeller speed agitation in such apparatus operating to cleanly separate the husk material as a froth concentrate from the grain material as a tailings product without, in the case of oats, the addition of flotative reagents other than the natural oils inherent in the grain material, a slight amount of a frother added toward the end of the separatory action perhaps serving to facilitate completion of the separation. Barley treated in this manner requires a frothing reagent to bring the husks into the froth. Of course, the desired separation of detached material may be accomplished through gravity methods.

Whatever be the specific grain treated by the improved method, it is essential that the grain be freely agitated in a water bath, with or without prior water-conditioning, in a manner which permits free and active movement of the grain for loosening and detachment of the outer bran coat or husks, and subsequent separation and separate removal of the detached material from the cleaned grain berries. As above pointed out, this separation of the detached material may be variously accomplished, separation by means of decantation or froth flotation having certain practical advantages, although the separation may well be accomplished by establishing a current of water through the mixture of material after detachment is complete in a manner to elevate the lighter husk or bran material and flow it away from the heavier grain berries, or the mixture of material may be thoroughly dried and subjected to a current of air which will lift and blow away the lighter material, or the mixture of husk and berry material may be passed over riffles or vibrating tables where the lighter material is carried away to leave the berry material trapped against the riffle or on the tables. Naturally, any combination of specific husk detaching method and separatory phase or phases suitable to a given grain for the production of the desired ultimate product or products may be employed without departing from the spirit and operative principle of the invention. Even when separation is had through decantation or froth flotation, it may be desirable to subject the cleaned grain berries, after drying, to a current or blast of air for removal of minute particles of the bran or husk material entrapped with or mechanically entrained by said berries.

The improved method method herein described may be advantageously combined with the grain-treating methods described in my Patents Numbers 2,155,219 and 2,143,306, the first of which described a method for the separatory treatment of seed and grain material whereby such material is selectively divided according to fertility, while the second patent relates to and describes a method for the cleansing of seed and grain material to eliminate therefrom infesting and disease-promoting agencies as well as diseased and infested grains. Both of the methods described in the patents noted utilize froth flotation apparatus and technique to obtain the ends sought, hence it is particularly convenient to combine the method of the instant invention, when practiced through froth flotation means, with and as a supplement to either or both of the methods disclosed in said patents. It is particularly convenient to first separate the grain material according to relative fertility in the manner taught by my Patent Number 2,155,219, then apply the teaching of my Patent Number 2,143,306 to the separated portions of the grain material for the removal of infested and diseased material and the infesting and disease-promoting agents, and then continue treatment of that portion of the grain material which is to be milled in the manner herein described for detachment and separate recovery of the husk or bran portions thereof, all of which may readily be done in a continuous sequence with high efficiency and at low cost. Of course, the grain material may first be treated for separation according to fertility and for cleansing therefrom of the infesting agencies and particles by means of froth flotation apparatus and the cleaned and selected portion of the material then agitated in a rod mill or equivalent agitating device for detachment of the bran or husk portions thereof, whereafter the final separation and removal of the husk material may be accomplished through froth flotation apparatus, various combinations of method steps and operating means being hence available for adaptation of the improved method to specific grains according to the products desired and the facilities at hand.

The improved method herein described has further practical advantage in its use to decrease the time required for the germination of grain. Wheat treated for the removal of its outer bran coat sprouted much more rapidly when the outer of the bran coats was removed than it did prior to such removal, such sprouting occurring in less than half the time required for the untreated grain, but removal of the entire woody bran coat, while it enhanced the sproutability of those grains which germinated, apparently so damaged the embryo as to destroy the germinating power of most of the material so treated.

Wheat treated for removal of its outer bran coat in the manner hereabove described was milled and the resulting flour baked in the form of various breads. The flour handles easily and reacts well with leavening agents, and the bread baked therefrom is of excellent texture and has a distinctive and pleasing flavor.

Utilizing a 1000 gram, Denver Equipment Company, Sub-A Laboratory Flotation Cell one-half full of water, 250 grams of soft white wheat was added to the cell and the impeller operated at half speed for some two to three minutes, which time was adequate for the loosening of the first part of the outer bran coat. At the end of the time noted, three to four drops of pine oil (6 to 8 pounds per ton) were added to the cell, the water content of the cell raised to within about an inch below the overflow lip, and the impeller speed increased to approximately 2200 revolutions per minute and operated for another three minutes, whereupon the first part of the outer bran coat was rapidly levitated into the froth bed and entirely removed from the cell in some three to five minutes of high speed impeller actuation. After removal of this first part of the outer bran coat was complete, agitation was continued and another drop of pine oil (2 pounds per ton) was added to the cell contents and the second part of the outer bran coat was brought up into the froth bed and entirely removed in about two minutes. Agitation was continued for another three minutes thereafter and one drop of oleic acid and two drops of pine oil was added to the cell during continued impeller actuation and the third or final part of the outer bran coat was thereby brought up into the froth bed in a very brief time, leaving the thoroughly debranned and cleaned grain berries in the cell. With this particular wheat, the first part of the bran coat lamination represented three and one-tenth percent of the original material weight, the second part represented seven-tenths of one percent of such total weight and the third part represented three-tenths of one percent of such weight. The same test as above described was applied to a hard, red wheat, using the same apparatus and the same nature and quantity of reagents, in which case the first and second parts of the outer bran coat, together, represented two and seven-tenths percent of the total material weight while the third part represented three-tenths of one percent of such weight.

When rye was subjected to the same treatment as above set forth, the first and second parts of the outer bran coat removed represented, together, two and eight-tenths percent of the total material weight, while the third part represented six-tenths of one percent of such weight. When barley is treated by the improved method, the weight of husks removed approximates twelve percent of the original material weight, and the husks removed from oats through practice of the improved method approximate forty percent of the original material weight.

Since the improved method is susceptible of successful application in a variety of specific adaptations to the removal, either partially or entirely, of the husk and bran material from various specific grains, and must necessarily be varied somewhat in the specific technique employed for efficient treatment of certain specific grain material, I wish to be understood as being limited solely by the scope of the appended claims, rather than by any details of the foregoing description.

I claim as my invention—

1. The method of peeling the outermost woody bran coat lamination from cereal grains having a plurality of bran coat laminations, without substantial alteration of the physical conformation of the grain, which consists of two time-related steps, viz., loosening and detaching of the outermost bran coat material of the grain through freely-circulating agitation of the grain material in a body of water; and simultaneously levitating the bran material away from the grains as an incident of the detaching agitation and immediately upon its separation from the grain through the addition to the water body of air and of a relatively minute amount of a froth flotation reagent having a selective affinity for such outermost bran coat material.

2. The method of peeling the outermost woody bran coat lamination from cereal grains having a plurality of bran coat laminations, without substantial alteration of the physical conformation of the grain, which consists of two-time related steps, viz., loosening and detaching of the outermost bran coat material of the grain through freely-circulating and aerating agitation of the grain material in a body of water; and simultaneously levitating the bran material away from the grains as an incident of the detaching and aerating agitation and immediately upon its separation from the grain through the addition to the water body of a relatively minute amount of a froth flotation reagent having a selective affinity for such outermost bran coat material.

3. The method of progressively peeling bran coat laminations from cereal grains having a plurality of such coat laminations, without substantial alteration of the physical conformation of the grain, which consists of loosening and detaching the outermost bran coat material of the grain through freely-circulating and aerating agitation of the grain material in a body of water, simultaneously levitating the detached bran material away from the grain as an incident of the detaching and aerating agitation and immediately upon its separation from the grain through the addition to the water body of a relatively minute amount of a froth flotation reagent having a selective affinity for such outermost bran coat material, removing the levitated material, loosening and detaching freshly-exposed bran coat material through further freely-circulating and aerating agitatiton of the grain material in water, and simultaneously levitating the thus detached bran coat material away from the grain as an incident of the detaching and aerating agitation and immediately upon its separation from the grain through the addition to the agitated water body of a relatively minute amount of a froth flotation reagent having a selective affinity for such freshly-exposed bran coat material.

THEODORE EARLE.